US012644579B2

(12) United States Patent
Vdovin et al.

(10) Patent No.: US 12,644,579 B2
(45) Date of Patent: Jun. 2, 2026

(54) LIGHT GENERATING SYSTEM WITH CCT-TUNABLE LASER

(71) Applicant: SIGNIFY HOLDING B.V., Eindhoven (NL)

(72) Inventors: Olexandr Valentynovych Vdovin, Maarheeze (NL); Martinus Petrus Joseph Peeters, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/993,825

(22) PCT Filed: Jul. 4, 2023

(86) PCT No.: PCT/EP2023/068309
§ 371 (c)(1),
(2) Date: Jan. 13, 2025

(87) PCT Pub. No.: WO2024/012927
PCT Pub. Date: Jan. 18, 2024

(65) Prior Publication Data

US 2026/0016139 A1 Jan. 15, 2026

(30) Foreign Application Priority Data

Jul. 12, 2022 (EP) .................................... 22184289

(51) Int. Cl.
*F21V 9/30* (2018.01)
*F21K 9/62* (2016.01)
(Continued)

(52) U.S. Cl.
CPC .................. *F21V 9/30* (2018.02); *F21K 9/62* (2016.08); *F21K 9/64* (2016.08); *F21V 9/20* (2018.02);
(Continued)

(58) Field of Classification Search
CPC ... F21V 13/08; F21V 3/08; F21V 9/30; F21V 9/20; F21V 14/08; F21K 9/64; F21K 9/62; F21Y 113/10; F21Y 115/30
See application file for complete search history.

(56) References Cited

U.S. PATENT DOCUMENTS

2005/0041424 A1* 2/2005 Ducharme ............. F21V 13/08 362/545
2009/0122530 A1 5/2009 Beers et al.
(Continued)

FOREIGN PATENT DOCUMENTS

WO 2021032721 A1 2/2021
WO 2021052900 A1 3/2021
WO 2021083730 A1 5/2021

*Primary Examiner* — William J Carter

(57) ABSTRACT

The invention provides a light generating system (1000) comprising a first light generating device (110), a second light generating device (120), a luminescent material (200), a first optical element (410), and a control system (300), wherein: the first light generating device (110) is configured to generate blue first device light (111), wherein the first light generating device (110) comprises one or more of a laser diode and a superluminescent diode; wherein the second light generating device (120) is configured to generate red second device light (121), wherein the second light generating device (120) comprises one or more of a laser diode and a superluminescent diode; the luminescent material (200) is configured downstream of the first light generating device (110), wherein the luminescent material (200) is configured to convert at least part of the first device light (111) into luminescent material light (201) having one or more wavelengths in the green-yellow wavelength range; the first optical element (410) is configured in a light receiving relationship with the first light generating device (110) and the luminescent material (200); wherein (i) the first optical element (410) has a controllable wavelength
(Continued)

dependent transmission in the blue wavelength range, and/or (ii) the first optical element (410) has a controllable wavelength dependent reflection in the blue wavelength range; the light generating system (1000) is configured to generate system light (1001) comprising one or more of the first device light (111), the second device light (121), and the luminescent material light (201); and the control system (300) is configured to control a spectral power distribution of the system light (1001) by controlling the first optical element (410), wherein the control system (300) is configured to control the correlated color temperature of the system light (1001) at a value selected from the range of 1800-6500 K, wherein the correlated color temperature of the system light (1001) is controllable over a CCT control range of at least 250 K within the range of 1800-6500 K.

15 Claims, 5 Drawing Sheets

(51) Int. Cl.

| | |
|---|---|
| ***F21K 9/64*** | (2016.01) |
| ***F21V 9/20*** | (2018.01) |
| ***F21V 14/08*** | (2006.01) |
| ***F21Y 113/10*** | (2016.01) |
| ***F21Y 115/30*** | (2016.01) |

(52) U.S. Cl.

CPC ........... *F21V 14/08* (2013.01); *F21Y 2113/10* (2016.08); *F21Y 2115/30* (2016.08)

(56) References Cited

U.S. PATENT DOCUMENTS

| | | | | |
|---|---|---|---|---|
| 2010/0289395 A1* | 11/2010 | Sun | F21V 29/74 313/45 |
| 2013/0154510 A1* | 6/2013 | Sutardja | H05B 45/35 315/297 |
| 2017/0162547 A1* | 6/2017 | Bergmann | H10H 20/857 |
| 2020/0171181 A1* | 6/2020 | Bae | H10H 20/857 |
| 2020/0236760 A1* | 7/2020 | Meir | G02B 6/0068 |

* cited by examiner

LIGHT GENERATING SYSTEM WITH CCT-TUNABLE LASER

CROSS-REFERENCE TO PRIOR APPLICATIONS

This application is the U.S. National Phase application under 35 U.S.C. § 371 of International Application No. PCT/EP2023/068309, filed on Jul. 4, 2023, which claims the benefit of European Patent application Ser. No. 22/184,289.1, filed on Jul. 12, 2022. These applications are hereby incorporated by reference herein.

FIELD OF THE INVENTION

The invention relates to a light generating system. The invention further relates to a lighting device comprising the light generating system.

BACKGROUND OF THE INVENTION

Illumination systems are known in the art. US2009/0122530, for instance, describes solid state illumination systems which provide—according to US2009/0122530—improved color quality and/or color contrast. The systems provide total light having delta chroma values for each of the fifteen color samples of the color quality scale that are preselected to provide—according to US2009/0122530—enhanced color contrast relative to an incandescent or black-body light source, in accordance with specified values which depend on color temperature. Illumination systems provided in US2009/0122530 may comprise one or more organic electroluminescent element, or they may comprise a plurality of inorganic light emitting diodes, wherein at least two inorganic light emitting diodes have different color emission bands. WO2021/052900A1 discloses a light generating device configured to generate white device light, and comprising (i) a first light source configured to generate blue first light source light, wherein the first light source is a first laser light source, (ii) a first luminescent material configured to convert part of the blue first light source light into first luminescent material light having an emission band having wavelengths in one or more of the green and yellow, (iii) an optical filter configured to optically filter the first luminescent material light into optically filtered first luminescent material light, whereby the optically filtered first luminescent material light is red-shifted relative to the first luminescent material light, and (iv) a second light source configured to generate red second light source light, wherein the second light source comprises a second laser light source.

SUMMARY OF THE INVENTION

Laser based light sources are gathering much interest due to their potential in producing relatively high flux from relatively small light emitting areas. The high brightness of these sources may facilitate miniaturization and more precise control of light distribution with optics. It may further be desired to have a high brightness light source for general lighting applications tunable in the broad range of color space/CCTs with good color rendering. Usually, to achieve color tuneability, a combination of several sources with different starting color points may be required (being e.g. various sources with different phosphors, different primary colors from direct emitters (e.g. RGB) or a combination of those). In order to create a high brightness color-tunable light source, these multiple sources may need to be optically combined with good color mixing, and without additional increase of etendue. However, for systems with direct RGB lasers, barring impractical primary laser wavelengths requirements, e.g. due to intrinsic narrow spectral width of laser lines and/or practical limitations, e.g. to certain limited spectral ranges, the optical combination of multiple sources often results in a relatively low CRI. Further, for systems with more than one phosphor converter, the etendue tends to increase substantially (such as at least ×2 times), which may be undesired for high brightness applications. Further, prior art systems may require a multi-channel driver and/or additional color mixing. Further, it may be desirable to use commonly available light sources, rather than requiring specialty equipment.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system ("system") comprising a first light generating device, a second light generating device, a luminescent material, a first optical element, and a control system. In embodiments, the first light generating device may be configured to generate blue first device light (or "first device light"). In contrast, in embodiments, the second light generating device may be configured to generate red second device light (or "second device light"). In further embodiments, the first light generating device may comprise one or more of a laser diode and a superluminescent diode, especially a laser diode, or especially a superluminescent diode. Similarly, in embodiments, the second light generating device may comprise one or more of a laser diode and a superluminescent diode, especially a laser diode, or especially a superluminescent diode. In embodiments, the luminescent material may be configured (or "arranged") downstream of the first light generating device, especially wherein the luminescent material is configured to convert at least part of the first device light into luminescent material light. The luminescent material light may especially have one or more wavelengths in the green-yellow wavelength range. In further embodiments, the first optical element may be configured in a light receiving relationship with the first light generating device and the luminescent material, especially wherein (i) the first optical element has a controllable wavelength dependent transmission in the blue wavelength range, and/or (ii) the first optical element has a controllable wavelength dependent reflection in the blue wavelength range. Hence, in embodiments, the light generating system may be configured to generate system light comprising one or more of the first device light, the second device light, and the luminescent material light. The control system may, in embodiments, be configured to control, especially in an operational mode of the light generating system, a spectral power distribution of the system light, especially by controlling (at least) the wavelength dependent transmission of the first optical element. In further embodiments, the control system may be configured to control, especially in the operational mode, the correlated color temperature (or "CCT") of the system light at a value selected from the range of 1800-6500 K, especially wherein the correlated color temperature of the system light is controllable over a CCT control range of at least 250 K within the range of 1800-6500 K.

The system of the invention may provide the benefit that a high brightness light source is provided with a high CRI, and which further facilitates controlling the correlated color temperature of the system light. In particular, the system may, in embodiments, comprise a (single) phosphor converter element, a (single) blue laser, and a (single) red laser. The red laser with emission in a practically available wavelength range is used to increase the CRI and to provide a color point on a black body locus (BBL) for low CCTs. The system of the invention may facilitate providing system light with a small etendue and with tunable CCT, such as in with tunability in the range of from 2700K to 6500K, while maintaining a high CRI, such as a CRI of, for instance, at least 80 or higher.

In particular, the system light may comprise blue first device light, red second device light, and green-yellow luminescent material light, which may (together) provide a high CRI. In particular, the red second device light may further contribute to a high R9 value (red rendering). As the first optical element may provide a controllable and wavelength-dependent modification, especially transmission, or especially reflection, in the blue wavelength range, the relative contribution of the blue first device light in the system light may be modified, thereby modifying the correlated color temperature (CCT) of the system light. Further, the relative contribution of the red second device light in the system light may be modified, such as in accordance with modifications of the relative contribution of the blue first device light, to steer towards a specific color point, such as a color point on the BBL. The light generating system of the invention may, in specific embodiments, comprise: at least one blue laser; a phosphor converting element receiving laser pump light and resulting in white light (not necessary on a BBL) with high CCT; optics to collect and pre-collimate phosphor converted light with partially transmitted blue light; a spectral filtering element placed after collimating optics, transmitting green-yellow converted light, with a possibility to partially suppress blue laser light, depending on its orientation; a red laser added/combined to the main optical path of the phosphor-converted source; and means to tune the transmission of the blue light after phosphor conversion, such as by changing the angle of the spectral filtering element with respect to the main optical axis.

In specific embodiments, the invention may provide a light generating system comprising a first light generating device, a second light generating device, a luminescent material, a first optical element and a control system, wherein: the first light generating device is configured to generate blue first device light, wherein the first light generating device comprises one or more of a laser diode and a superluminescent diode, wherein the second light generating device is configured to generate red second device light, wherein the second light generating device comprises one or more of a laser diode and a superluminescent diode; the luminescent material is configured downstream of the first light generating device, wherein the luminescent material is configured to convert at least part of the first device light into luminescent material light having one or more wavelengths in the green-yellow wavelength range; the first optical element is configured in a light receiving relationship with the first light generating device and the luminescent material, wherein (i) the first optical element has a controllable wavelength dependent transmission in the blue wavelength range, and/or (ii) the first optical element has a controllable wavelength dependent reflection in the blue wavelength range; the light generating system is configured to generate system light comprising one or more of the first device light, the second device light, and luminescent material light; and the control system is configured to control a spectral power distribution of the system light by controlling the wavelength dependent transmission of the first optical element, wherein the control system is configured to control the correlated color temperature of the system light at a value selected from the range of 1800-6500 K, wherein the correlated color temperature of the system light is controllable over a CCT control range of at least 250 K within the range of 1800-6500 K.

Hence, the invention may provide a light generating system. The light generating system may especially be configured to provide system light. The light generating system may especially comprise a first light generating device and a second light generating device.

In embodiments, the first light generating device may be configured to generate blue first device light, i.e., first device light comprising a (centroid) wavelength in a blue wavelength range. The terms "blue light" or "blue emission" especially relates to light having a wavelength in the range of about 440-495 nm (including some violet and cyan hues). Hence, in embodiments, the first light generating device may be configured to generate first device light, wherein the first device light comprises a (centroid) wavelength in the range of (about) 440-495 nm. In further embodiments, at least 80% of the spectral power of the first device light may fall in the range of 440-495 nm, such as at least 90%. In particular, the first light generating device may comprise a first light source, wherein the first light source is configured to provide the (blue) first device light.

In further embodiments, the second light generating device may be configured to generate red second device light, i.e., second device light comprising a (centroid) wavelength in a red wavelength range. The terms "red light" or "red emission" especially relate to light having a wavelength in the range of about 620-780 nm. Hence, in embodiments, the second light generating device may be configured to generate second device light, wherein the second device light comprises a (centroid) wavelength in the range of (about) 620-780 nm. In further embodiments, at least 80% of the spectral power of the second device light may fall in the range of 620-780 nm, such as at least 90%. In particular, the second light generating device may comprise a second light source, wherein the second light source is configured to provide the (blue) first device light.

The first light generating device may, in embodiments, especially comprise one or more of a laser diode and a superluminescent diode, especially at least a laser diode, or especially at least a superluminescent diode. Similarly, in embodiments, the second light generating device may comprise one or more of a laser diode and a superluminescent diode, especially at least a laser diode, or especially at least a superluminescent diode.

The term "laser" especially refers to a device that emits light through a process of optical amplification based on the stimulated emission of electromagnetic radiation. Especially, in embodiments the term "laser" may refer to a solid-state laser. In specific embodiments, the terms "laser" or "laser light source", or similar terms, may refer to a laser diode (or diode laser).

Hence, in embodiments the first light generating device (or the second light generating device, especially the first light source (or the second light source), may comprise a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF2) laser, Ce:YAG laser, Er:YAG laser, erbium doped and erbium-ytterbium codoped glass lasers, F-Center laser, holmium YAG (Ho: YAG) laser, Nd:YAG laser, NdCrYAG laser, neodymium doped yttrium calcium oxoborate Nd:YCa4O(BO3)3 or Nd:YCOB, neodymium doped yttrium orthovanadate (Nd: YVO4) laser, neodymium glass (Nd:glass) laser, neodymium YLF (Nd:YLF) solid-state laser, promethium 147 doped phosphate glass (147Pm3+:glass) solid-state laser, ruby laser (A12O3:Cr3+), thulium YAG (Tm:YAG) laser, titanium sapphire (Ti:sapphire; Al2O3:Ti3+) laser, trivalent uranium doped calcium fluoride (U:CaF2) solid-state laser, Ytterbium doped glass laser (rod, plate/chip, and fiber), Ytterbium YAG (Yb:YAG) laser, Yb2O3 (glass or ceramics) laser, etc.

In embodiments, the terms “laser” or “solid state laser” may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the description below, the term “laser light source” may also refer to a plurality of (different or identical) laser light sources. In specific embodiments, the term “laser light source” may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. In further embodiments, the first light generating device may comprise a single light source. Similarly, in embodiments, the second light generating device may comprise a single light source.

The first laser light source (or second laser light source) may be configured to generate laser light source light (or “laser light”). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at room temperature (RT), such as equal to or less than 10 nm. Hence, the light source light may have a spectral power distribution (intensity on an energy scale as function of the wavelength) which may comprise one or more (narrow) bands. In particular, in embodiments, the first light generating device may be configured to provide first device light having a FWHM≤20 nm, such as ≤10 nm, especially at room temperature, i.e., in embodiments, the first device light may have a FWHM≤20 nm, such as ≤10 nm, especially at room temperature. In further embodiments, the second light generating device may be configured to provide the second device light having a FWHM≤20 nm, such as ≤10 nm, especially at room temperature, i.e., in embodiments, the second device light may have a FWHM≤20 nm, such as ≤10 nm, especially at room temperature.

The beams (of light source light) may be focused or collimated beams of (laser) light source light. The term “focused” may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments≤2° (FWHM), more especially≤1° (FWHM), most especially≤0.5° (FWHM). Hence, ≤2° (FWHM) may be considered (highly) collimated light source light. Optics may be used to provide (high) collimation (see also above).

Superluminescent diodes are known in the art. A superluminescent diode may be indicated as a semiconductor device which may be able to emit low-coherence light of a broad spectrum like an LED, while having a brightness in the order of a laser diode. US2020192017 indicates for instance that “With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission”. Further, superluminescent diodes are amongst others described, in “Edge Emitting Laser Diodes and Superluminescent Diodes”, Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time” and “Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the semiconductor light source has the advantages that the speckle is significantly reduced or not visible, and that the spectral distribution of emission is much broader compared to laser diodes, which broader spectral distribution can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

In embodiments, the light generating system may comprise a luminescent material. The luminescent material may especially be configured downstream of the first light generating device, especially with respect to the first device light, i.e., the luminescent material may be arranged in a light-receiving relationship with the first light generating device. In particular, the first light generating device may be configured to provide the first device light along a first device light path, optionally via one or more optical elements, such as transmissive and/or reflective optical elements, and the luminescent material may (at least partially) be arranged in the first device light path.

The luminescent material may especially be configured to convert at least part of the first device light into luminescent material light. In embodiments, the luminescent material light may have one or more wavelengths in the green-yellow wavelength range, especially. The terms "green light" or "green emission" especially relate to light having a wavelength in the range of about 495-570 nm. The terms "yellow light" or "yellow emission" especially relate to light having a wavelength in the range of about 570-590 nm. Hence, the term "green-yellow light" or "green-yellow emission" may especially relate to light having a wavelength in the range of (about) 495-590 nm. Hence, in embodiments, the luminescent material may be configured to convert at least part of the first device light into luminescent material light, wherein the luminescent material light has a (centroid) wavelength in the range of 495-590 nm. In further embodiments, at least 80% of the spectral power of the luminescent material light may fall in the range of 495-590 nm, such as at least 90%.

The term "luminescent material" especially refers to a material that can convert first device light, especially blue light, into luminescent material light. In general, the first device light and the luminescent material light have different spectral power distributions. Hence, instead of the term "luminescent material", also the terms "luminescent converter" or "converter" may be applied. In general, the luminescent material light has a spectral power distribution at larger wavelengths than the first device light, which is the case in the so-called down-conversion. In embodiments, the "luminescent material" may especially refer to a material that can convert radiation into e.g. visible light. For instance, in embodiments, the luminescent material may be able to convert blue light into visible light. Hence, upon excitation with blue light, the luminescent material may emit radiation. In general, the luminescent material will be a down converter, i.e. radiation of a short wavelength is converted into radiation with a longer wavelength ($\lambda ex<\lambda em$).

In embodiments, the term "luminescence" may refer to phosphorescence. In embodiments, the term "luminescence" may also refer to fluorescence. Instead of the term "luminescence", also the term "emission" may be applied. Hence, the terms "first device light" and "luminescent material light" may refer to excitation radiation and emission (radiation), respectively. Likewise, the term "luminescent material" may in embodiments refer to a phosphorescent material and/or a fluorescent material.

The term "luminescent material" may also refer to a plurality of different luminescent materials. Examples of possible luminescent materials are indicated below. Hence, the term "luminescent material" may in specific embodiments also refer to a luminescent material composition.

For instance, experiments have been performed with different luminescent materials from the group of $A_3B_5O_{12}$:Ce. In particular, tests have been performed with combinations of (i) a first light generating device with a first centroid wavelength selected from the group comprising 445 nm, 450 nm, 455 nm, and 465 nm, (ii) a second light generating device with a second centroid wavelength selected from the group comprising 630 nm, 632 nm, 634 nm, 636 nm, 638 nm, and 640 nm, and (iii) a luminescent material selected from the group comprising of $A_3B_5O_{12}$:Ce. It will be clear to the person skilled in the art that the choice for centroid wavelengths and phosphors may depend on the desired CCT, CRI, and R9. With respect to CCT values in the range of 2700-4000 K, particularly good results were obtained—across the indicated centroid wavelengths of the first and second light generating device—with luminescent materials selected from the group of $A_3B_5O_{12}$:Ce. Hence, in embodiments, the luminescent material may be selected from the group of $A_3B_5O_{12}$:Ce.

In embodiments, the luminescent material may be selected from garnets and nitrides, especially doped with trivalent cerium or divalent europium, respectively. The term "nitride" may also refer to oxynitride or nitridosilicate, etc. Note that the "term luminescent material" may also refer to a combination of two or more different luminescent materials.

As indicated above, in specific embodiments, the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials may be cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc, and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full and detailed formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$, especially wherein at maximum 10% of B—O may be replaced by Si—N.

In further embodiments, A may comprise one or more of Gd and Lu, and B may comprises at least 90 at. % Al. In further embodiments, the luminescent material may comprise 0.1-2 at. % cerium relative to A.

In further embodiments the luminescent material may comprise $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In further embodiments, at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_y)_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In, and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2-0. Alternatively or additionally, in embodiments y2=0.

In specific embodiments, A may especially comprise at least Y, and B may especially comprise at least Al.

Alternatively or additionally, the luminescent material may comprise a luminescent material of the type $A_3Si_6N_{11}$:$Ce^{3+}$, wherein A comprises one or more of Y, La, Gd, Tb and Lu, such as in embodiments one or more of La and Y.

In embodiments, the luminescent material may alternatively or additionally comprise one or more of MS:$Eu^{2+}$ and/or $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca. Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba, Sr,Ca)S:Eu, (Ba,Sr,Ca)$AlSiN_3$:Eu and (Ba, $Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials. Instead of the term "luminescent material" also the term "phosphor" may be applied. These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In embodiments, the luminescent material may be comprised by a luminescent body. Especially, the luminescent material is comprised by a luminescent body. The luminescent body may be a layer, like a self-supporting layer. The luminescent body may also be a coating. The luminescent body may also comprise a luminescent coating on a support (especially a light transmissive support in the transmissive mode, or a reflective support in the reflective mode). Especially, the luminescent body may essentially be self-supporting. In embodiments, the luminescent material may be provided as luminescent body, such as a luminescent single crystal, a luminescent glass, or a luminescent ceramic body. Such body may be indicated as "converter body" or "luminescent body". In embodiments, the luminescent body may be a luminescent single crystal or a luminescent ceramic body. For instance, in embodiments a cerium comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or, the glass as such may be luminescent. In other embodiments, the luminescent body may comprise a polymeric body, with luminescent material embedded therein. In embodiments the luminescent body may be a crystalline body, or a ceramic body, or a luminescent material dispersed in another material, like e.g. a polymeric body (see further also below). In further embodiments, at least one of the one or more luminescent bodies comprises a ceramic body. Further, in embodiments at least one of the one or more luminescent bodies comprises (a) a luminescent material of the type $A_3B_5O_{12}$:Ce, wherein A comprises one or more of Y, La, Gd, Tb and Lu, and wherein B comprises one or more of Al, Ga, In and Sc, and/or (b) a luminescent material of the type $A_3Si_6N_{11}$:$Ce^{3+}$, wherein A comprises one or more of Y, La, Gd, Tb and Lu. especially wherein A comprises one or more of La and Y. Further, in embodiments the one or more luminescent bodies are a single luminescent body. Hence, the system may comprise a single luminescent body. The luminescent body is especially configured to receive at least part of the first device light. Hence, in embodiments the luminescent body is configured downstream of the first light generating device. Further, the luminescent body may especially be configured in a light receiving relationship with the first light generating device.

In embodiments, the luminescent material may be operated in a transmissive mode, i.e., light provided to the luminescent material may essentially enter the luminescent material at a first side (and may optionally be converted) and may exit the luminescent material at a second side, especially wherein the first side and the second side are arranged on opposite sides of the luminescent material. In further embodiments, the luminescent material may be operated in a reflective mode, i.e., the light provided to the luminescent material may enter the luminescent material at a first side (and may optionally be converted) and may exit the luminescent material at the first side.

The light generating system may, in embodiments, further comprise a first optical element. The first optical element may especially be configured in a light receiving relationship with the first light generating device and the luminescent material, i.e., the first optical element may be configured to receive at least part of the (blue) first device light and at least part of the luminescent material light. The first optical element may especially provide a controllable and wavelength-dependent modification of light provided to the first optical element. In particular, in embodiments, the first optical element may have a controllable wavelength dependent transmission in the blue wavelength range. In further embodiments, the first optical element may have a controllable wavelength dependent reflection in the blue wavelength range. Thereby, by controlling the wavelength-dependent modification, especially via transmission, or especially via reflection, of the blue first device light, the amount of blue light in the (system) light downstream of the first optical element may be controlled. Hence, the first optical element may facilitate controlling the CCT of the system light by providing a means to control the proportion of blue first device light in the system light.

As further described below, the CCT may further be influenced by the (power of the) second light generating device, especially under control of the control system.

In further embodiments, relative to an optical axis of the (blue) first device light the dichroic filter may be moveable, such as tiltable, or such as displaceable, especially wherein the control system is configured to control the movement, such as to control a position of the position of the dichroic filter. For instance, in embodiments, the light generating system may comprise an actuator configured to move, such as tilt, or such as displace, the first optical element, especially wherein the control system is configured to control the actuator. In further embodiments, the wavelength dependent transmission in the blue wavelength range may be dependent upon a position, such as a tilt angle (α), or such as a displacement (d). Hence, the control system may be configured to control the position, may thereby control the transmission (or reflection) of light in the blue wavelength range, and may thereby control the correlated color temperature of the system light.

In embodiments, such as wherein the first optical element comprises a dichroic filter, at a first position (p1) the transmission in the (at least part of the) blue wavelength range is at most 0.5 times the transmission in the (at least part of the) blue wavelength range at a second position (p2), i.e., relative to the second position (p2), the transmission of blue light may be reduced by a factor two by moving, such as tilting, or such as displacing, the first optical element to the first position (p1). In further embodiments, at the first position (p1) the transmission in the (at least part of the) blue wavelength range is at most 0.75 times the transmission in the (at least part of the) blue wavelength range at the second position (d2), especially at most 0.4 times, such as at most 0.3 times, especially at most 0.2 times.

In embodiments, such as wherein the first optical element comprises a dichroic mirror, at a first position (p1) the reflection in the (at least part of the) blue wavelength range is at most 0.5 times the reflection in the (at least part of the) blue wavelength range at a second position (p2), i.e., relative to the second position (p2), the reflection of blue light may be reduced by a factor two by moving the first optical element to the first position (p1). In further embodiments, at the first position (p1) the reflection in the (at least part of the) blue wavelength range is at most 0.75 times the reflection in the (at least part of the) blue wavelength range at the second position (p2), especially at most 0.4 times, such as at most 0.3 times, especially at most 0.2 times.

In embodiments, the first optical element may comprise a dichroic filter. In particular, in embodiments, relative to an optical axis of the (blue) first device light the dichroic filter may be tiltable, especially wherein the control system is configured to control the tilt angle (α). The tilt angle may especially refer to the angle between (i) a plane defined by the first optical element and (ii) the optical axis of the first device light (as it arrives at the first optical element). In further embodiments, the wavelength dependent transmission in the blue wavelength range is dependent upon the tilt angle (α). Hence, the control system may be configured to control the tilt angle (α), may thereby control the transmission (or reflection) of light in the blue wavelength range, and may thereby control the correlated color temperature of the system light. To this end, the control system may control the above-mentioned actuator.

Similarly, in embodiments, the first optical element may comprise a dichroic mirror (or "dichroic reflector"), especially wherein relative to an optical axis of the (blue) first device light the dichroic filter may be tiltable, especially wherein the control system is configured to control the tilt angle (α). In further embodiments, the wavelength dependent reflection in the blue wavelength range is dependent upon the tilt angle (α).

In embodiments, the tilt angle (α) may be controllable in the range of 0°-90° (relative to the optical axis), such as in the range of 15°-90°, especially in the range of 30°-90°, such as in the range of 45°-90°. Hence, in embodiments the first optical element, especially the dichroic mirror, may be configured perpendicular to the optical axis and controllable relative to this optical axis with a deviation up to about 45°. In embodiments, a tilt of 45° may be a tilt clockwise or counterclockwise.

In embodiments wherein the first optical element comprises a dichroic filter, at a first tilt angle (α1) the transmission in the blue wavelength range, especially in at least part of the blue wavelength range, or especially in the entire blue wavelength range, is at most 0.5 times the transmission in the blue wavelength range, such as in the at least part of the blue wavelength range, at a second tilt angle (α2), i.e., relative to the second tilt angle (α2), the transmission of blue light may be reduced by a factor two by tilting the first optical element to the first tilt angle (α1). In further embodiments, at the first tilt angle (α1) the transmission in the blue wavelength range is at most 0.75 times the transmission in the (at least part of the) blue wavelength range at the second tilt angle (α2), especially at most 0.4 times, such as at most 0.33 times, especially at most 0.25 times, such as at most 0.2 times.

In embodiments wherein the first optical element comprises a dichroic mirror, at a first tilt angle (α1) the reflection in the (at least part of the) blue wavelength range is at most 0.5 times the reflection in the (at least part of the) blue wavelength range at a second tilt angle (α2), i.e., relative to the second tilt angle (α2), the reflection of blue light may be reduced by a factor two by tilting the first optical element to the first tilt angle (α1). In further embodiments, at the first tilt angle (α1) the reflection in the (at least part of the) blue wavelength range is at most 0.75 times the reflection in the (at least part of the) blue wavelength range at the second tilt angle (α2), especially at most 0.4 times, such as at most 0.3 times, especially at most 0.2 times. In embodiments, the at least part of the blue wavelength range may especially comprise the range of 440-495 nm, especially the range of 440-480 nm, such as the range of 445-475 nm.

In particular, the transmission (or reflection) of light in the green-yellow wavelength range and in the red wavelength range by the first optical element may be substantially independent of the tilt angle (α). For instance, in embodiments, the dichroic filter may transmit at least 80% of the second device light and of the luminescent material light irrespective of the tilt angle (α), such as at least 90%, especially at least 95%, such as at least 97%.

In further embodiments, the dichroic filter may comprise one or more of a dichroic longpass filter and a dichroic narrow-band notch filter, especially a dichroic longpass filter, or especially a dichroic narrow-band notch filter.

In embodiments, the first optical element may be (linearly) displaced, such as relative to an optical axis of the first device light, especially wherein the control system is configured to control the displacement (d). In further embodiments, the wavelength dependent transmission in the blue wavelength range is dependent upon the displacement (d). Hence, the control system may be configured to control the displacement (d), may thereby control the transmission (or reflection) of light in the blue wavelength range, and may thereby control the correlated color temperature of the system light.

In embodiments, the control system may be configured to control the displacement (d), especially by controlling the actuator, to move the first optical element between the first position (p1) and the second position (p2).

As indicated above, the control system may control the above-mentioned actuator, which may control the displacement.

In particular, the transmission (or reflection) of light in the green-yellow wavelength range and in the red wavelength range by the first optical element may be substantially independent of the tilt angle (α). For instance, in embodiments, the dichroic filter may transmit at least 80% of the second device light and of the luminescent material light irrespective of the tilt angle (α), such as at least 90%, especially at least 95%, such as at most 97%.

As described above, the light generating system may be configured to generate system light comprising one or more of the first device light, the second device light, and the luminescent material light. In particular, in general, the system light may comprise (at least part of) the first device light, (at least part of) the second device light, and (at least part of) the luminescent material light.

As indicated above, the light generating system may further comprise a control system. The control system may especially be configured to control one or more of the first light generating device, the second light generating device, and the first optical element.

In embodiments, the control system may be configured to control, especially in an operational mode (of the light generating system), a spectral power distribution of the system light. In particular, the control system may be configured to control the spectral power distribution by controlling (at least) the first optical element, especially by controlling at least the tilt angle α of the first optical element. Hence, the control system may be configured to control the spectral power distribution of the system light by controlling the transmission or reflection of the first optical element in the blue wavelength range.

In further embodiments, the control system may be configured to control, especially in an operational mode (of the light generating system), the correlated color temperature of the system light at a value selected from a correlated color temperature range, such as from the range of 1800-6500 K. The correlated color temperature range may, in embodiments, comprise the range of 1800-6500 K. In further embodiments, the correlated color temperature range may comprise the range of 2700-6500 K. In further embodiments, the correlated color temperature range may comprise the range of 4000-5500 K.

In particular, in embodiments, the correlated color temperature of the system light may be controllable over a CCT control range within the correlated color temperature range, such as within the range of 1800-6500 K. In further embodiments, the CCT control range may be at least 250 K, such as at least 500 K, especially at least 750 K, such as at least 1000 K. For instance, if the CCT control range is 250 K, the control system may control the system light to have a first CCT and a second CCT, wherein the first CCT and the second CCT are 250 K apart. An example of a CCT control range of at least 250 K may be a controllable CCT between 2700-2950 K and a CCT control range of at least 1000 K may be a controllable CCT between 2700-3700 K. In further embodiments, the CCT control range may be at most 2500 K, such as at most 2000 K, especially at most 1500 K.

In particular, the system light may have a CRI of at least 70, especially at least 75, such as at least 80, especially at least 85, over the CCT control range, i.e., for (essentially) any value of CCT within the CCT control range, the CRI of the system light may be at least 70.

Similarly, in embodiments, the system light may have an R9 of at least 0, such as at least 10, especially at least 20, such as at least 30 over the CCT control range.

In embodiments, the light generating system may comprise a second optical element, especially wherein the second optical element comprises a collimator element. The second optical element may especially be configured downstream of the luminescent material (and of the first light generating device). In further embodiments, the second optical element may be configured upstream of the first optical element. Hence, the second optical element may be configured in a light-receiving relationship with the first light generating device and the luminescent material, and may be configured to provide collimated light to the first optical element, especially collimated first device light and collimated luminescent material light.

The light generating system may further comprise (other) optics (see also above). The term "optics" may especially refer to (one or more) (third) optical elements. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term "optics" may refer to a holographic element or a mixing rod. In embodiments, the optics may include one or more of beam expander optics and zoom lens optics.

In embodiments, the light generating system may further comprise a light mixing chamber. The light mixing chamber may especially be configured downstream of the first light generating device. In particular, the light mixing chamber may (also) be configured upstream of (at least part of) the luminescent material. Hence, in embodiment, the light mixing chamber may be configured between the first light generating device and the light mixing chamber, especially along (or "within") a first device light path. In particular, the light mixing chamber may be configured in a light-receiving relationship with the first light generating device, and may be configured to provide (mixed) first device light to the luminescent material.

The term "light mixing chamber" may herein especially refer to an optical element, especially a light guide, or especially an optical chamber, configured to mix light from a plurality of sources such as to provide an (essentially) homogeneous spectrum in the far field. An optical chamber may comprise light reflective walls.

As described above, the control system may be configured to control the first light generating device. In particular, the control system may be configured, especially in an operational mode (of the light generating system) to control the first device light provided by the first light generating device by controlling the first light generating device.

For instance, in embodiments, a first centroid wavelength ($\lambda_{C1}$) of the first device light may be dependent upon a temperature of the first light generating device. In such embodiments, the control system may be configured to control the spectral power distribution of the system light by controlling the first centroid wavelength ($\lambda_{C1}$) of the first device light, such as by controlling the temperature of the first light generating device.

In embodiments, the first centroid wavelength ($\lambda_{C1}$) of the first device light may be controlled by controlling a current through the first light generating device, especially wherein the first light generating device comprises a solid state device.

The light generating system comprises a plurality of first light generating devices, wherein two or more first light generating devices are configured to generate first device light having different centroid wavelengths in the blue wavelength range. The control system is configured to control the spectral power distribution of the system light by controlling radiant fluxes of the device light of the two or more first light generating devices. Similarly, in such embodiments, the light mixing chamber may be configured in a light-receiving relationship with the two or more first light generating devices, especially with the plurality of first light generating devices.

Similarly, in embodiments, the control system may be configured to control the second light generating device. In particular, the control system may be configured, especially in an operational mode (of the light generating system) to control the second device light provided by the second light generating device by controlling the second light generating device. For instance, in embodiments, the control system may be configured to control a flux of the second device light by controlling the second light generating device, such as by controlling an output power of the second light generating device.

In further embodiments, a second centroid wavelength ($\lambda_{C2}$) of the second device light may be dependent upon a temperature of the second light generating device. In such embodiments, the control system may be configured to control the spectral power distribution of the system light by controlling the second centroid wavelength ($\lambda_{C2}$) of the second device light, such as by controlling the temperature of the second light generating device.

In embodiments, the luminescent material may provide luminescent material light having a luminescent material light centroid wavelength $\lambda_{CL}$. Especially, the luminescent material light centroid wavelength $\lambda_{CL}$ may be selected from the range of 495-590 nm, such as from the range of 520-590 nm, such as from the range of 550-590 nm, especially from the range of 560-580 nm.

In further embodiments, the first centroid wavelength $\lambda_C1$ may be selected from the range of 440-500 nm, such as from the range of 440-490 nm, especially from the range of 440-480 nm, such as from the range of 450-480 nm. In further embodiments, the first centroid wavelength may be selected from the range of 440-470 nm, especially from the range of 445-465 nm. In further embodiments, the first centroid wavelength may be selected from the group comprising 445, 450, 455, and 465 nm. In further embodiments, the first centroid wavelength may be 445 nm. In further embodiments, the first centroid wavelength may be 450 nm. In further embodiments, the first centroid wavelength may be 455 nm. In further embodiments, the first centroid wavelength may be 465 nm.

Similarly, in embodiments, the second centroid wavelength $\lambda_{C2}$ may be selected from the range of 620-780 nm, such as from the range of 620-650 nm, especially from the range of 630-650 nm. In further embodiments, the second centroid wavelength may be selected from the range of 630-640 nm. In further embodiments, the second centroid wavelength may be selected from the group comprising 630, 632, 634, 636, 638, 640 nm. In further embodiments, the second centroid wavelength may be 630. In further embodiments, the second centroid wavelength may be 632 nm. In further embodiments, the second centroid wavelength may be 634 nm. In further embodiments, the second centroid wavelength may be 636. In further embodiments, the second centroid wavelength may be 638 nm. In further embodiments, the second centroid wavelength may be 640 nm.

In particular, excellent results may be obtained in embodiments wherein the first device light has a first centroid wavelength ($\lambda_{C1}$) selected from the range of 440-480 nm, wherein the second device light has a second centroid wavelength ($\lambda_{C2}$) selected from the range of 620-650 nm, and wherein the luminescent material light has a luminescent material light centroid wavelength ($\lambda_{CL}$) selected from the range of 560-580 nm.

The second device light may be combined with the first device light and the luminescent material light to provide the system light.

Hence, the control system may be configured to control the relative contributions of the first device light, the second device light, and of the luminescent material light in the system light. In particular, the control system may tune the color point of the system light by controlling the relative contributions of the first device light, the second device light, and of the luminescent material light in the system light, such as to (substantially) change the CCT of the system light while remaining on the BBL.

In embodiments, the first device light and the second device light may be combined upstream of the luminescent material. Hence, in embodiments, the luminescent material may be transmissive for the second device light, especially transparent, or especially translucent. In particular, in embodiments, the luminescent material may be configured in a light receiving relationship with the second light generating device. Especially, the second light generating device may be configured upstream of the luminescent material (and of the first optical element).

The (red) second device light may be transmitted through (or be reflected by) the luminescent material without conversion, which may lead to a visible red speckle, which may be undesired. Hence, in embodiments wherein the second light generating device is configured to provide (red) second device light to the luminescent material (see below), the second light generating may comprise a superluminescent diode. Thereby, the (red) speckle may be eliminated.

In further embodiments, the first device light and the second device light may be combined downstream of the luminescent material, i.e., the second device light may be combined with the first device light and the luminescent material light.

In further embodiments, the first device light and the second device light may be combined downstream of the first optical element.

In embodiments, the light generating system may further comprise a beam combiner, especially one or more beam combiners, such as a plurality of beam combiners. The beam combiner may especially be configured to combine the first device light and the second device light. Especially, the beam combiner may be configured to combine the first device light, the luminescent material light, and the second device light. In embodiments, the beam combiner may be selected from the group of a surface scattering diffuser, a volume scattering diffuser, a holographic optical element, a light pipe, a light guide, a Koehler integrator optics, a collimator, a dichroic beam combiner, a dichroic cube, a dichroic beam splitter, a diffraction grating, and a polarizing beam splitter, especially from the group of a holographic optical element, a light pipe, a Koehler integrator optics, a collimator, a dichroic beam combiner, a dichroic cube, a dichroic beam splitter, a diffraction grating, and a polarizing beam splitter. In further embodiments, the beam combiner may especially comprise a fiber bundle combiner, especially wherein the fiber bundle combiner is configured to combine the first device light and the second device light.

In embodiments, the beam combiner may be configured downstream of the first light generating device (with respect to a first device light path) and downstream of the second light generating device (with respect to a second device light path of the second device light). In further embodiments, the beam combiner may be configured upstream of the luminescent material. Alternatively, in further embodiments, the beam combiner may be configured downstream of the luminescent material. Similarly, in embodiments, the beam combiner may be configured upstream of the first optical element, whereas in further embodiments, the beam combiner may be configured downstream of the first optical element.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In embodiments, the system light may comprise white light. Hence, in embodiments, the light generating system may be configured to generate white light, especially with a variable CCT.

The term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. In embodiments, e.g. for backlighting purposes, or for other purposes, the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the correlated color temperature (CCT) may be selected from the range of 6000-12000 K, like selected from the range of 7000-12000 K, like at least 8000 K. Yet further, in embodiments the correlated color temperature (CCT) may be selected from the range of 6000-12000 K, like selected from the range of 7000-12000 K, especially in combination with a CRI of at least 70.

The terms "visible", "visible light" or "visible emission" and similar terms refer to light having one or more wavelengths in the range of about 380-780 nm. Herein, UV may especially refer to a wavelength selected from the range of 190-380 nm, such as 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "orange light" or "orange emission" especially relate to light having a wavelength in the range of about 590-620 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The phrase "light having one or more wavelengths in a wavelength range" and similar phrases may especially indicate that the indicated light (or radiation) has a spectral power distribution with at least intensity or intensities at these one or more wavelengths in the indicate wavelength range. For instance, a blue emitting solid state light source will have a spectral power distribution with intensities at one or more wavelengths in the 440-495 nm wavelength range.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, which can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In yet a further aspect, the invention also provides a lamp or a luminaire comprising the light generating system as defined herein. The luminaire may further comprise a housing, optical elements, louvres, etc. etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of the first light generating device, the second light generating device, the luminescent material, and the first optical element.

Instead of the terms "lighting device" or "lighting system", and similar terms, also the terms "light generating device" or "light generating system", (and similar terms), may be applied. A lighting device or a lighting system may be configured to generate device light (or "lighting device light") or system light ("or lighting system light"). As indicated above, the terms light and radiation may interchangeably be used.

The lighting system may comprise a light source. The system light may in embodiments comprise one or more of light source light and converted light source light (such as luminescent material light).

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N) IR" is applied, to refer to in general IR, and in specific embodiments to NIR. Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR.

The term "centroid wavelength", also indicated as $\lambda c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity).

The centroid wavelength may e.g. be determined at operation conditions.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
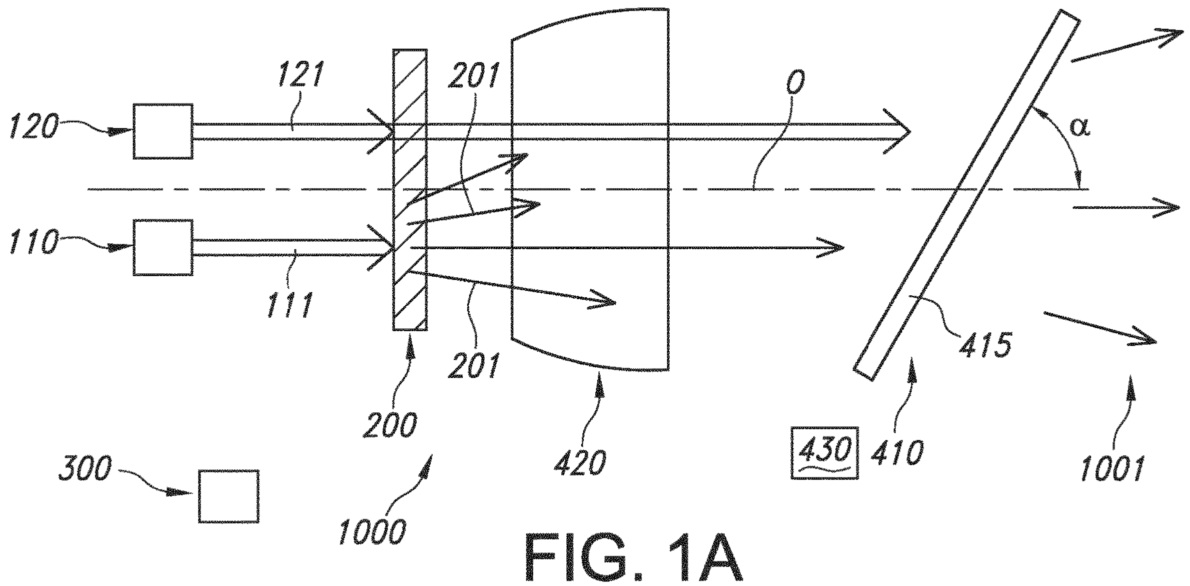
FIGS. 1A-C schematically depict embodiments of the light generating system.
Figure 1B:
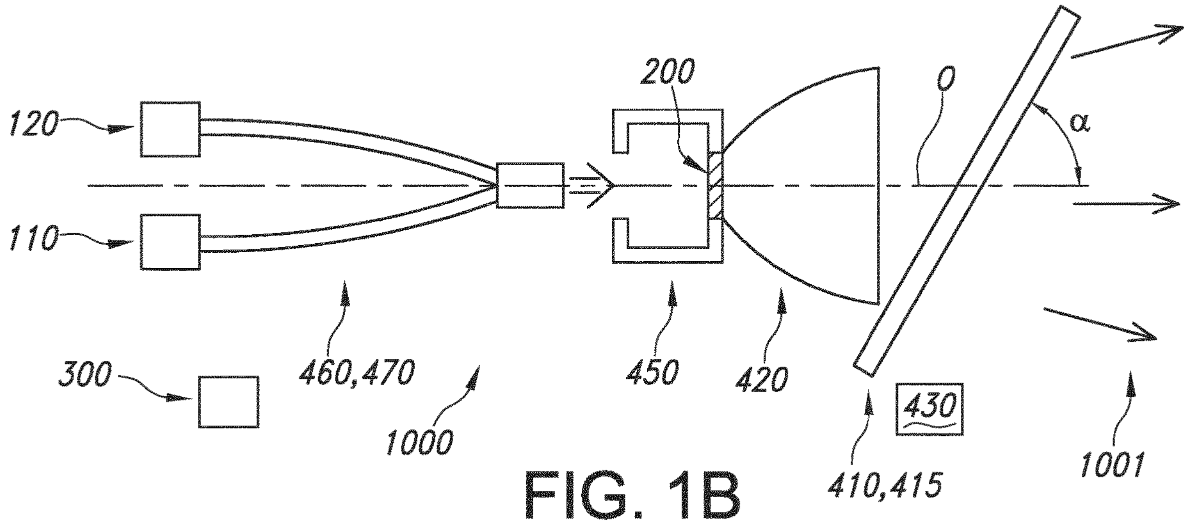
Figure 1C:
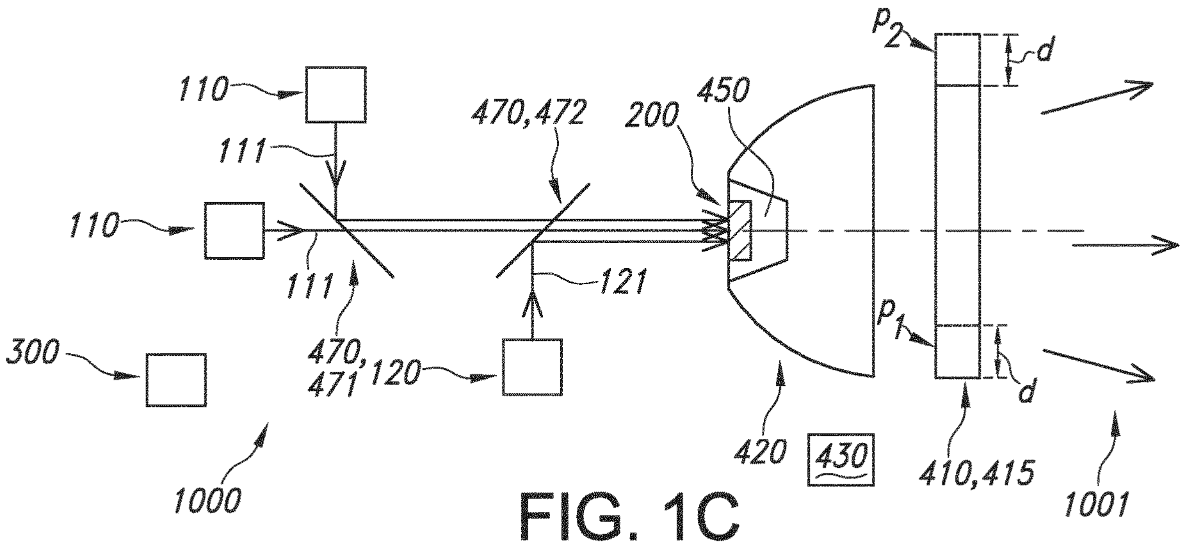

FIG. 1A-C schematically depict embodiments of the light generating system of the invention. In the depicted embodiments, the light generating system 1000 comprising a first light generating device 110, a second light generating device 120, a luminescent material 200, and a first optical element 410. In the depicted embodiments, the first light generating device 110 is configured to generate blue first device light 111, and the second light generating device 120 is configured to generate red second device light 121. In particular, both the first light generating device 110 and the second light generating device 120 may (each) comprise one or more of a laser diode and a superluminescent diode. The luminescent 200 material is configured to convert at least part of the first device light 111 into luminescent material light 201, and is (thus) configured downstream of the first light generating device 110. The luminescent material light (201) may have one or more wavelengths in the green-yellow wavelength range. Hence, the light generating system 1000 may be configured to generate system light 1001 comprising one or more of the first device light 111, the second device light 121, and luminescent material light 201, wherein the first device light 111 comprises blue light, wherein the second device light 121 comprises red light, and wherein the luminescent material light 201 comprises green-yellow light. Thereby, the system light 1001 may have a suitable mix of colors for a high CRI, such as a CRI≥80. In the depicted embodiments, the first optical element 410 is configured in a light receiving relationship with the first light generating device 110 and the luminescent material 200. In particular, the first optical element 410 may have a controllable wavelength dependent transmission and/or reflection in the blue wavelength range. For instance, in the depicted embodiments, the first optical element 410 comprises a dichroic filter 415, wherein relative to an optical axis O of the first device light 111 the dichroic filter 415 is moveable, such as tiltable (FIG. 1A-B), or such as displaceable (FIG. 1C), especially wherein the wavelength dependent transmission in the blue wavelength range is dependent upon a position p, such as upon a tilt angle $\alpha$. As schematically depicted in FIG. 1A-B, the tilt angle $\alpha$ may especially be the angle between (i) a plane defined by the first optical element 410 and (ii) the optical axis O of the first device light 111 (as it arrives at the first optical element 410). In particular, in the depicted embodiments, the light generating system comprises an actuator 430 configured to move the first optical element 410. In such embodiments, the control system 300 may especially be configured to control the actuator 430. Hence, the amount of blue light in the system light may be tuned via the first optical element 410, whereby the CCT of the system light may be tuned. In particular, in embodiments, the control system 300 may be configured to control the tilt angle $\alpha$. In further embodiments, the control system 300 may be configured to control, especially in an operational mode (of the light generating system 1000) a spectral power distribution of the system light 1001 by controlling (at least) the wavelength dependent transmission (or the wavelength dependent reflection) of the first optical element 410. In further embodiments, the control system 300 may be configured to control, especially in an operational mode (of the light generating system 1000), the correlated color temperature of the system light 1001 at a value selected from the range of 1800-6500 K, especially wherein the correlated color temperature of the system light 1001 is controllable over a CCT control range of at least 250 K within the range of 1800-6500 K.

In the depicted embodiments, the luminescent material is operated in a transmissive mode. In further embodiments, the luminescent material may be operated in a reflective mode.

In further embodiments, the dichroic filter 415 may comprise one or more of a dichroic longpass filter, a dichroic (narrow-band) notch filter, and a linear filter, such as a linear variable filter (LVF), especially a dichroic longpass filter, or especially a dichroic narrow-band notch filter, or especially a linear variable filter.

FIG. 1A schematically depicts an embodiment wherein the light generating system 1000 further comprises a second optical element 420, wherein the second optical element 420 comprises a collimator element. In particular, in the depicted embodiment, the second optical element 420 is configured downstream of the luminescent material 200 and of the first light generating device 110 and is configured upstream of the first optical element 410.

FIG. 1B schematically depicts an embodiment wherein the light generating system 1000 further comprises a light mixing chamber 450 configured downstream of the first light generating device 110 and configured upstream of (at least part of) the luminescent material 200.

In the depicted embodiment, the luminescent material 200 is configured downstream of the second light generating device 120, specifically in a light receiving relationship with the second light generating device 120. Hence, in the depicted embodiment, the luminescent material 200 may be transmissive for the second device light 121. In particular, in the depicted embodiment, the light generating system 1000 further comprises a beam combiner 470, wherein the beam combiner 470 is configured to combine the first device light 111 and the second device light 121. Especially, the beam combiner 470 may comprise a fiber bundle combiner 460 configured to combine the first device light 111 and the second device light 121. In further embodiments, the beam combiner 470 may comprise a dichroic element configured to combine the first device light 111 and the second device light 121.

In particular, in the depicted embodiment, a mixture of blue and red laser light is entering a light mixing chamber 450 where a luminescent material 200 is excited with the blue laser light, and the red laser light is transmitted and partially being scattered. The converted white light is being collected and collimated by the second optical element 420, such as a compound parabolic concentrator (CPC), which may be attached to the luminescent material 200. In the depicted embodiment, the (pre-collimated) beam is passing through a dichroic longpass filter, where part of the blue transmitted light may be filtered out, depending on the angular orientation of the filter and a desired spectral composition. Finally, the resulting white beam may be further collimated, such as with a lens.

FIG. 1C schematically depicts an embodiment wherein the light generating system 1000 comprises a plurality of first light generating devices 110, wherein the light generating system 1000 further comprises a beam combiner configured to combine the first device light 111 of the plurality of first light generating devices 110. In such embodiments, especially two or more first light generating devices 110 may be configured to generate first device light 111 having different centroid wavelengths in the blue wavelength range. Further, in such embodiments, the control system 300 may be configured to control the spectral power distribution of the system light 1001 by controlling radiant fluxes of the device light 111 of the two or more first light generating devices 110.

Hence, in embodiments, the light generating system 1000 may comprise (a) a first beam combiner 470, 471 configured to combine the first device light 111 of a plurality of first light generating devices, and (b) a second beam combiner 470, 472 configured to combine the first device light 111 and the second device light 121.

In further embodiments, the beam combiner 470, especially the first beam combiner 470,471, or especially the second beam combiner 470,472, may be selected from the group of a surface scattering diffuser, a volume scattering diffuser, a holographic optical element, a light pipe, a light guide, a Koehler integrator optics, a collimator, a dichroic beam combiner, a dichroic cube, a dichroic beam splitter, and a polarizing beam splitter.

FIG. 1C further schematically depicts a displacement d of the first optical element 410, with which the first optical element can be moved between a first position p1 and a second position p2. In particular, in embodiments, the wavelength dependent transmission (or reflection) in the blue wavelength range may differ between the first position p1 and the second position p2. For instance, in embodiments, the first optical element 410 may comprise a patterned linear filter, where optical density for transmitted blue light is changing across the length of the filter, and tuneability is achieved by linear shift of the filter.

Figure 2A:
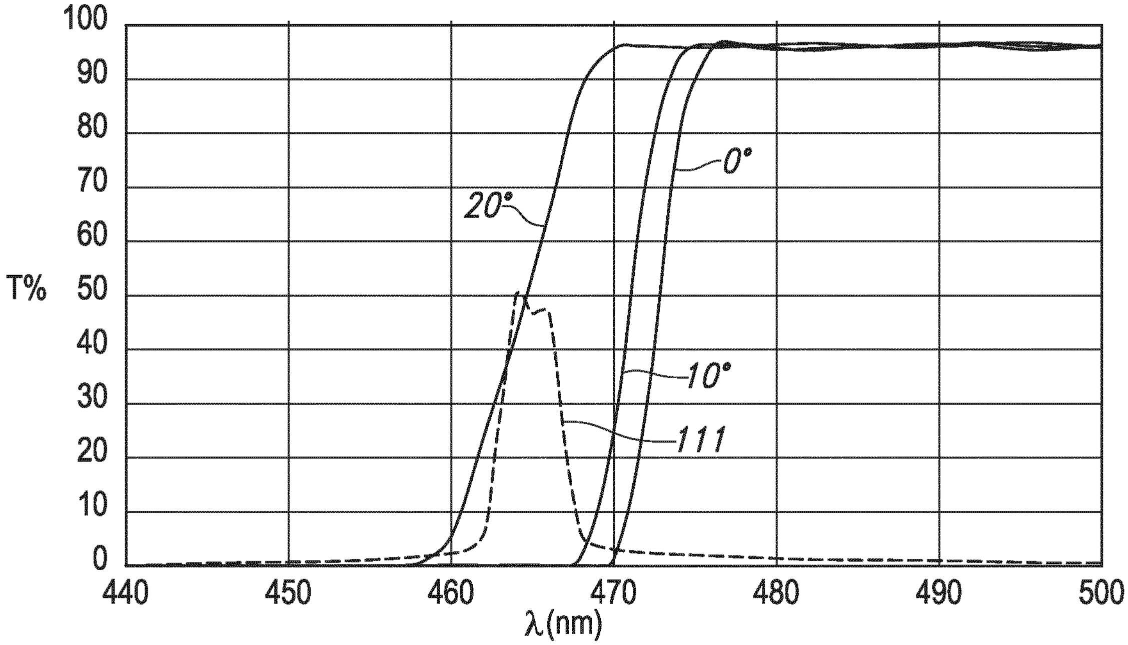
FIGS. 2A-3D schematically depict further aspects of embodiments of the light generating system.

FIG. 2A schematically depicts a spectrum of the first device light 111. FIG. 2A further schematically depicts the wavelength dependent transmission of embodiments of the first optical element 410 in transmission percentage (in %) versus wavelength λ (in nm). In particular, in the depicted embodiment the transmission is depended for angles of incidence on the first optical element 410 of 0°, 10° and 20°, i.e., for tilt angles α of about 90°, 80°, and 70°. Hence, with respect to a specific embodiment, the first device light 111 may be largely transmitted at an incidence angle of 20°, such as at an incidence angle of 30°, whereas the first device light 111 may be largely blocked at an incidence angle of 10°. However, even at an incidence angle of 0°, the second device light 121 and the luminescent material light 201 may be essentially fully transmitted, i.e., at least 90%, such as at least 93% of the second device light 121 and the luminescent material light 201 may be transmitted by the first optical element irrespective of the tilt angle α.

In particular, FIG. 2A schematically depicts that a variation of blue laser content in the system light 1001 can be achieved using the first optical element 410. Specifically, FIG. 2A shows that the transmission of a dichroic longpass filter can be changed depending on the angle of incidence of incoming light; the transmission edge of the filter is shifting towards shorter wavelengths with increasing angle on incidence. Having the edge of a filter at normal incidence close to the excitation laser wavelength and changing the filter angle with respect to the optical axis of light propagation it is possible to tune the amount of a blue light in a resulting spectrum, theoretically in the range from 0 to 95% relative to the initial intensity.

Figure 2B:
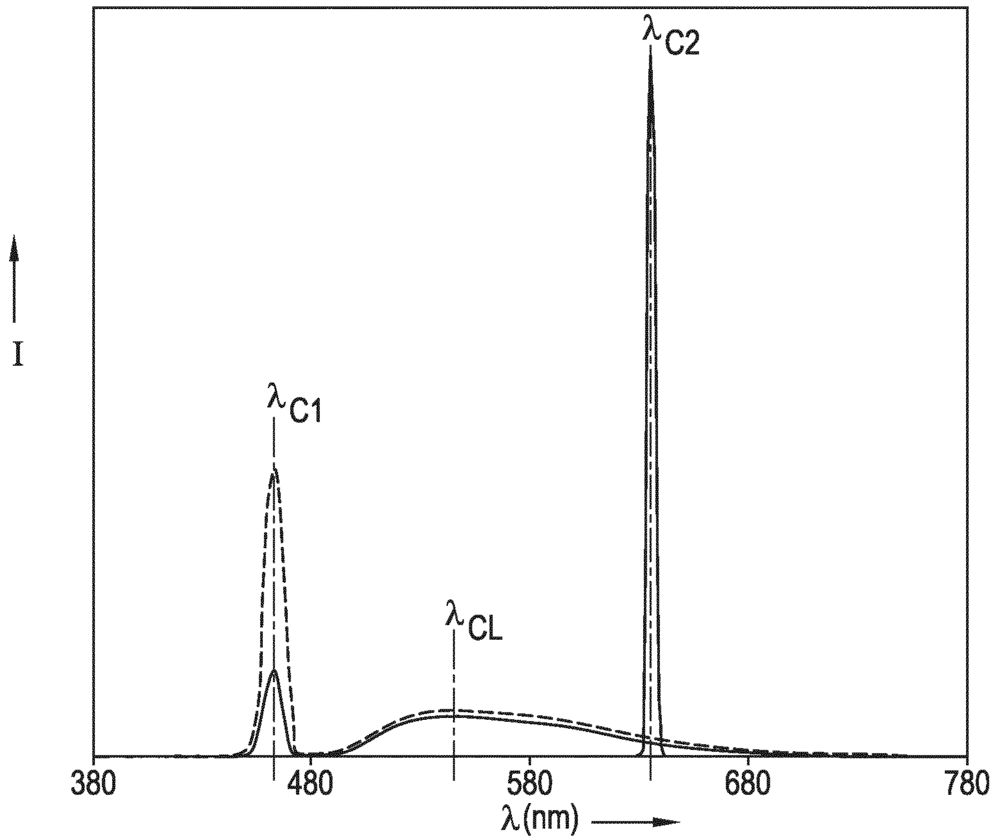

FIG. 2B schematically depicts a spectral power distribution of the system light 1001 in intensity I(in a.u.) versus wavelength λ (in nm), with indication of the first centroid wavelength $\lambda_{C1}$ of the first device light 111, of the second centroid wavelength $\lambda_{C2}$ of the second device light 121, and of the luminescent material light centroid wavelength $\lambda_{C2}$ of the luminescent material light 201. In particular, in the depicted embodiment, the first device light 111 has a first centroid wavelength $\lambda_{C1}$ selected from the range of 440-480 nm, wherein the second device light 121 has a second centroid wavelength $\lambda_{C2}$ selected from the range of 620-650 nm, and wherein the luminescent material light 201 has a luminescent material light centroid wavelength $\lambda_{CL}$ selected from the range of 520-590 nm, such as from the range of 550-590 nm.

In particular, FIG. 2B schematically depicts results of spectral simulations with practically available blue and red laser wavelengths and a Gd-doped YAG ceramic phosphor. Depending on the blue content in the spectrum it is possible to cover a broad CCT range of 2700-6500K, where red laser intensity is tuned to result in a color point on a BBL. The red laser wavelength of 638 nm is chosen because of practical availability of relatively inexpensive high-power lasers (>5W) for this wavelength range>637 nm. 465 nm for blue is chosen as the longest blue wavelength for commercially available laser diodes. Shorter blue wavelength could be more favorable for higher absorption by the YAG phosphor. However, the (relatively) long blue wavelength may also positively impact the CRI.

Figure 2C:
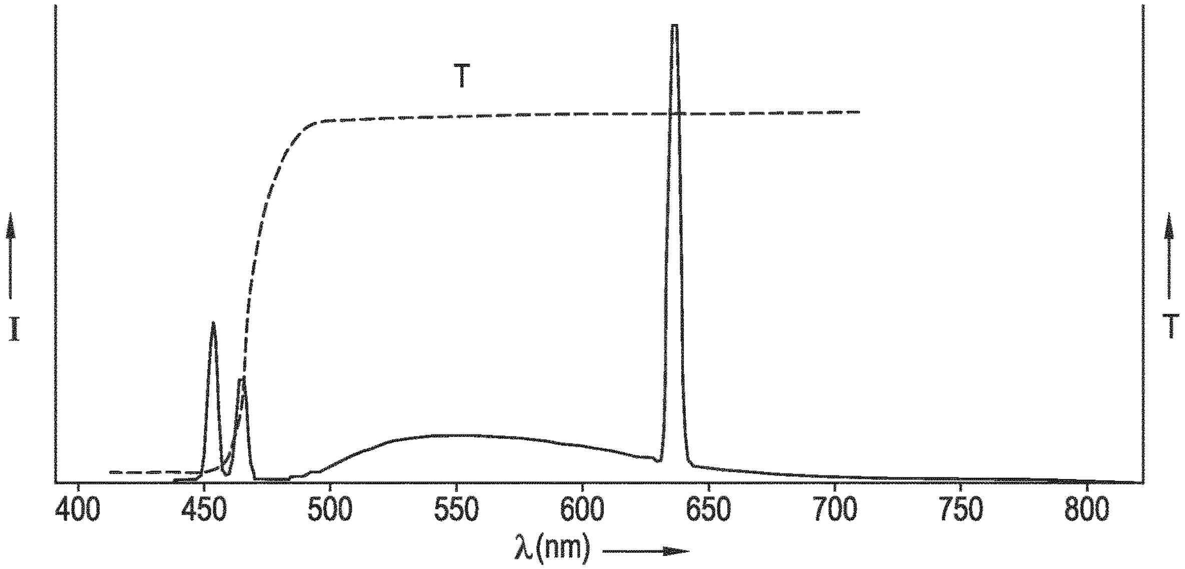

FIG. 2C schematically depicts a spectral power distribution of the system light 1001 provided by an embodiment of the light generating system 1001, wherein the light generating system 1000 comprises at least two first light generating devices 110, and wherein the first optical element 410 comprises a longpass filter, particularly a longpass filter with a controllable edge position, such as by controlling an angle α (see above). In particular, in the depicted embodiment, one of the at least two first light generating devices 110 is configured to provide first device light 111 with a centroid wavelength at about 455 nm for more efficient excitation of the luminescent material, while another of the at least two first light generating devices 110 is configured to provide first device light 111 with a centroid wavelength at around 465 nm line to contribute to CRI improvement. In this case the application of a longpass filter may be controlled to set the edge position at ~460 nm or above to set a total amount of transmitted blue light for an initial color point. Color point tuneability can further be influenced by electronically adjusting the amount of laser power from two separate blue laser channels. Hence, in the depicted embodiment, the one of the at least two first light generating devices 110 may provide first device light 111 to be partly converted to luminescent material light 201, while the remainder of the first device light 111 is blocked by the longpass filter, whereas the first device light 111 provided by another of the at least two first light generating devices 110 is essentially not converted by the luminescent material 200, and may largely pass the longpass filter. Thereby, the amount of blue light in the system light 1001 may be controlled by controlling the another of the at least two first light generating device 110.

In further embodiments, instead of a longpass filter, a narrow-band notch filter, such as with a band suppression at or close to 465 nm, can also be used. In such embodiments, a suppression band and transmission change may (also) be controlled as a function of the angle of incidence.

Further, color point tuneability without mechanical adjustments can be also achieved using an effect of wavelength shift of a laser diode emission wavelength as a function of temperature. Typical values for wavelength shift are ~1 nm/10° C., where emission shifts to longer wavelengths with temperature increase. Having a filter with a sharp transition edge and tuning a temperature of a laser diode (e.g., with a heating element) it is possible to adjust the amount of transmitted blue laser light through the dichroic filter in a broad range. Hence, in embodiments, a centroid wavelength $\lambda_{C1}$ of the first device light 111 may be dependent upon a temperature of the first light generating device 110, wherein the control system 300 is configured to control the spectral power distribution of the system light 1001 by controlling the centroid wavelength $\lambda_{C1}$ of the first device light 111, especially by controlling the temperature of the first light generating device 110.

Similarly, pulse width modulation (PWM) may be used to shift a centroid wavelength, especially while (essentially) maintaining an average flux. With the pulse width modulation, effectively also the temperature of the light generating device, especially its junction temperature, may be controlled. Hence, in embodiments, the control system 300 may be configured to control the spectral power distribution of the system light 1001 by controlling the centroid wavelength $\lambda_{C1}$ of the first device light 111 by controlling a pulse frequency of the first light generating device 110.

FIG. 3A-D schematically depict how the CRI and R9 values of the system light 1001 may, in embodiments, vary dependent on the (centroid) wavelength of the (blue) first device light 111. The longest wavelength in the studied practical range may be preferred for providing a high CRI in a broad CCT range. For instance, with a centroid wavelength of about 465 nm, a CRI of 90 may be realize for CCTs in the range of about 4000K to about 5500K.

Figure 3A:
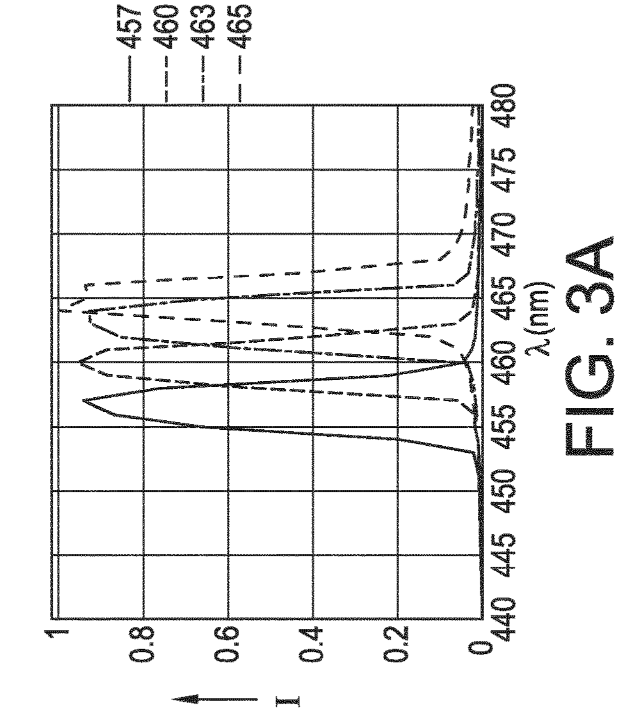

In particular, FIG. 3A schematically depicts the relative intensity I against wavelength λ (in nm) for blue light sources with centroid wavelengths at 457, 460, 463, and 465 nm.

Figure 3B:
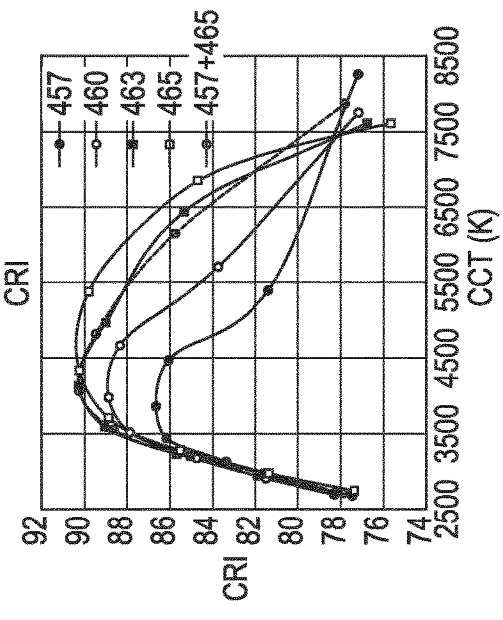

FIG. 3B schematically depicts the CRI against CCT (in K) for blue light sources with centroid wavelengths at 457, 460, 463, and 465 nm, or with a combination of two blue light sources with centroid wavelengths at 457 and 465 nm. Hence, a high CRI, such as about 80, especially above 85, or even above 90, may be obtained across a large CCT control range, depending on the selected centroid wavelength of the first device light 111.

Hence, in embodiments, the first device light may have a first centroid wavelength $\lambda_{C1}$ of at least 457, such as of at least 460, especially of at least 463, such as at least 465.

In further embodiments, the CCT control range may comprises at least 500 K, such as at least 1000K, especially at least 1500K within the range of 1800-6500 K, such as within the range of 2700-6500 K.

Figure 3C:
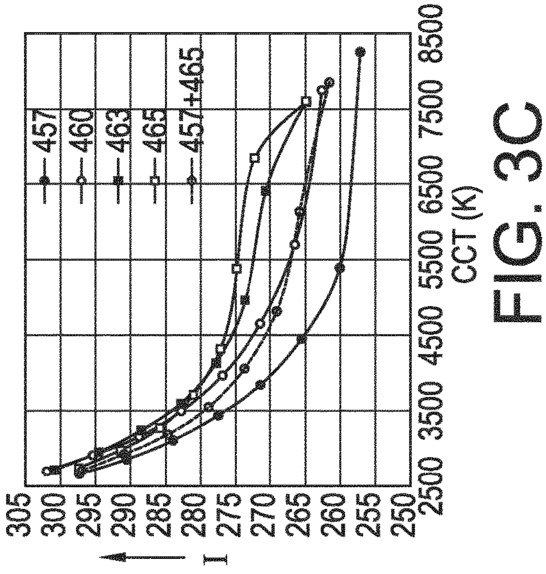

FIG. 3C schematically depicts the intensity I (in a.u.) against CCT (in K) for blue light sources with centroid wavelengths at 457, 460, 463, and 465 nm, or with a combination of two blue light sources with centroid wavelengths at 457 and 465 nm.

Figure 3D:
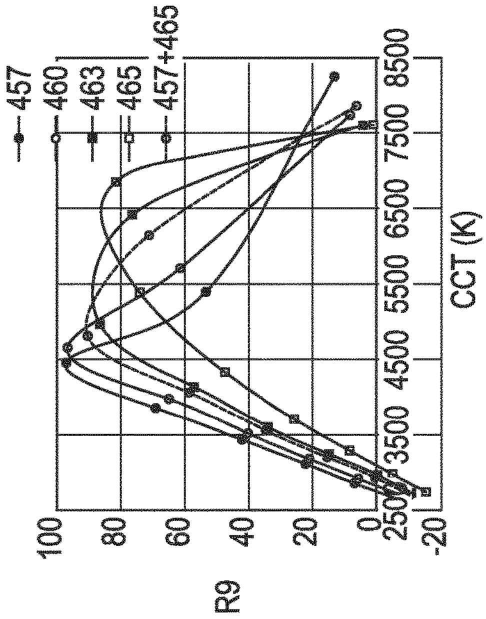

FIG. 3D schematically depicts the R9 against CCT (in K) for blue light sources with centroid wavelengths at 457, 460, 463, and 465 nm, or with a combination of two blue light sources with centroid wavelengths at 457 and 465 nm.

Figure 4:
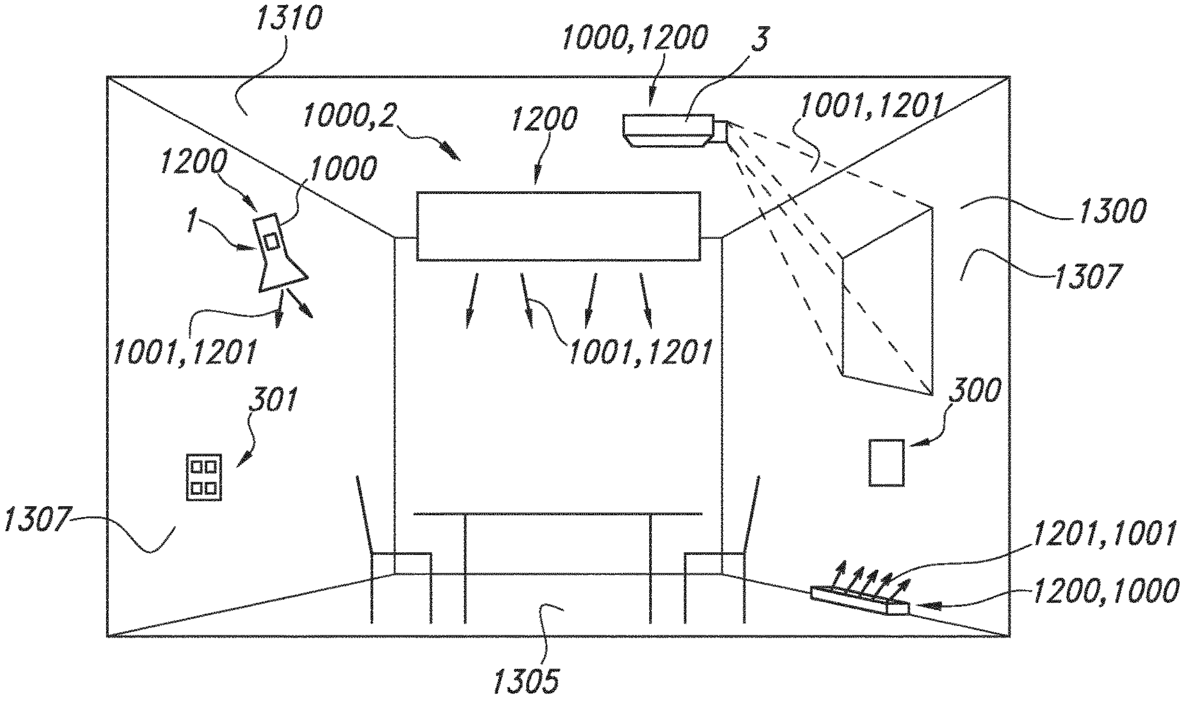
FIG. 4 schematically depicts an embodiment of the lighting device.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 3 also schematically depicts an embodiment of lamp 1 comprising the light generating system 1000. Reference 3 indicates a projector device or projector system, which may be used to project images, such as at a wall, which may also comprise the light generating system 1000. Hence, FIG. 3 schematically depicts embodiments of a lighting device 1200 selected from the group of a lamp 1, a luminaire 2, a projector device 3, a disinfection device, a photochemical reactor, and an optical wireless communication device, comprising the light generating system 1000 as described herein. In embodiments, such lighting device may be a lamp 1, a luminaire 2, a projector device 3, a disinfection device, a photochemical reactor, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 refers to a space, such as a room. Reference 1305 refers to a floor and reference 1310 to a ceiling; reference 1307 refers to a wall.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a first light generating device, a second light generating device, a luminescent material, a first optical element, and a control system, wherein:

the first light generating device is configured to generate blue first device light, wherein the first light generating device comprises one or more of a laser diode and a superluminescent diode; wherein the second light generating device is configured to generate red second device light, wherein the second light generating device comprises one or more of a laser diode and a superluminescent diode;

the luminescent material is configured downstream of the first light generating device, wherein the luminescent material is configured to convert at least part of the first device light into luminescent material light having one or more wavelengths in the green-yellow wavelength range;

the first optical element is configured in a light receiving relationship with the first light generating device and the luminescent material; wherein (i) the first optical element has a controllable wavelength dependent transmission in the blue wavelength range, and/or (ii) the first optical element has a controllable wavelength dependent reflection in the blue wavelength range;

the light generating system is configured to generate system light comprising one or more of the first device light, the second device light, and the luminescent material light;

the control system is configured to control a spectral power distribution of the system light by controlling the first optical element, wherein the control system is configured to control the correlated color temperature of the system light at a value selected from the range of 1800-6500 K, wherein the correlated color temperature of the system light is controllable over a CCT control range of at least 250 K within the range of 1800-6500 K; and the light generating system further comprising a plurality of first light generating devices, wherein two or more first light generating devices are configured to generate first device light having different centroid wavelengths in the blue wavelength range, wherein the control system is further configured to control the spectral power distribution of the system light by controlling radiant fluxes of the device light of the two or more first light generating devices.

2. The light generating system according to claim 1, wherein the first optical element comprises a dichroic filter, wherein relative to an optical axis of the first device light the dichroic filter is moveable, wherein the control system is configured to control a position of the dichroic filter, and wherein (i) the wavelength dependent transmission in the blue wavelength range is dependent upon the position, or wherein (ii) the wavelength dependent reflection in the blue wavelength range is dependent upon the position.

3. The light generating system according to claim 2, wherein the dichroic filter comprises one or more of a dichroic longpass filter, a dichroic narrow-band notch filter, and a linear variable filter.

4. The light generating system according to claim 2, wherein relative to the optical axis the dichroic filter is tiltable, wherein the control system is configured to control a tilt angle ($\alpha$) of the dichroic filter, and wherein (i) the wavelength dependent transmission in the blue wavelength range is dependent upon the tilt angle ($\alpha$), or wherein (ii) the wavelength dependent reflection in the blue wavelength range is dependent upon the tilt angle ($\alpha$).

5. The light generating system according to claim 1, further comprising a second optical element, wherein the second optical element comprises a collimator element, wherein the second optical element is (a) configured downstream of the luminescent material and of the first light generating device and (b) configured upstream of the first optical element, and wherein the luminescent material is operated in a transmissive mode.

6. The light generating system according to claim 1, further comprising a light mixing chamber configured downstream of the first light generating device and configured upstream of at least part of the luminescent material.

7. The light generating system according to claim 1, wherein a first centroid wavelength ($\lambda_{C1}$) of the first device light is dependent upon a temperature of the first light generating device, wherein the control system is configured to control the spectral power distribution of the system light by controlling the first centroid wavelength ($\lambda_{C1}$) of the first device light.

8. The light generating system according to claim 1, wherein the different centroid wavelengths in the blue wavelength range comprise a centroid wavelength ($\lambda_{C1}$) selected from the range of 445-465 nm and a centroid wavelength ($\lambda_{C1}$) selected from the range of 450-480 nm.

9. The light generating system according to claim 1, wherein the luminescent material comprises a luminescent material of the type $A_3B_5O_{12}$:Ce, wherein A comprises one or more of Y, La, Gd, Tb and Lu, and wherein B comprises one or more of Al, Ga, In and Sc.

10. The light generating system according to claim 9, wherein A comprises one or more of Gd and Lu, and wherein B comprises at least 90 at. % Al.

11. The light generating system according to claim 1, wherein the luminescent material is transparent or translucent for second device light, wherein the luminescent material is configured in a light receiving relationship with the second light generating device.

12. The light generating system according to claim 11, further comprising a beam combiner, wherein the beam combiner is configured to combine the first device light and the second device light, and wherein the beam combiner is selected from the group of a holographic optical element, a light pipe, a Koehler integrator optics, a collimator, a dichroic beam combiner, a dichroic cube, a dichroic beam splitter, a diffraction grating, a polarizing beam splitter, and a fiber bundle combiner.

13. The light generating system according to claim 1, wherein the CCT control range comprises a range of at least 500 K within the range of 1800-6500 K.

14. The light generating system according to claim 1, wherein the first device light has a first centroid wavelength ($\lambda_{C1}$) selected from the range of 440-490 nm, wherein the second device light has a second centroid wavelength ($\lambda_{C2}$) selected from the range of 620-650 nm, and wherein the luminescent material light has a luminescent material light centroid wavelength ($\lambda_{CL}$) selected from the range of 560-580 nm.

15. A lighting device selected from the group of a lamp, a luminaire, a projector device, a disinfection device, a photochemical reactor, and an optical wireless communication device, comprising the light generating system according to claim 1.

* * * * *